United States Patent Office 3,616,491
Patented Nov. 2, 1971

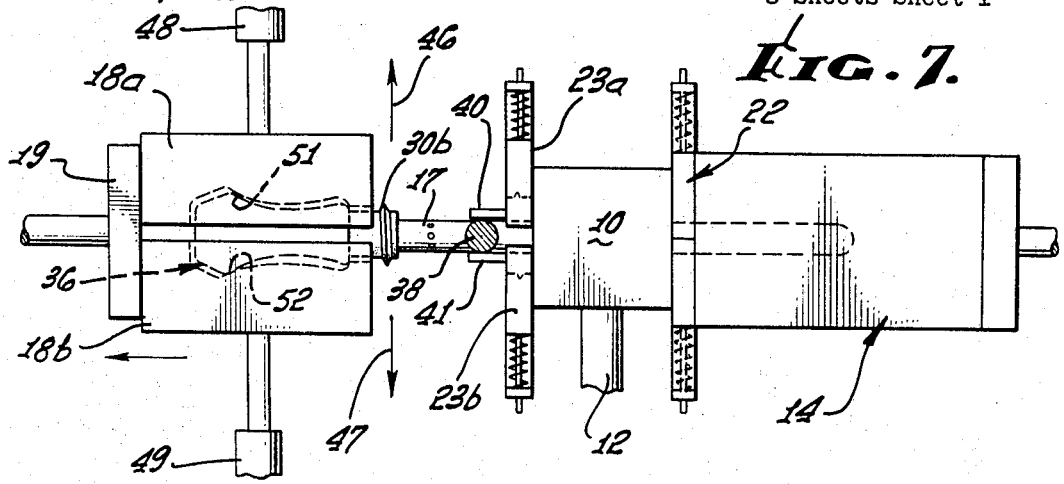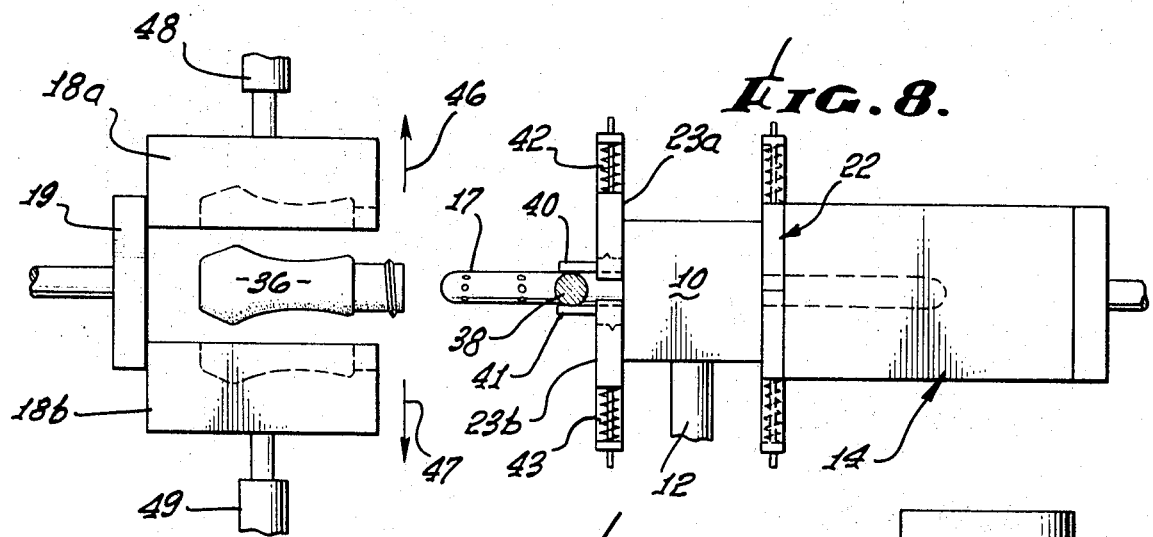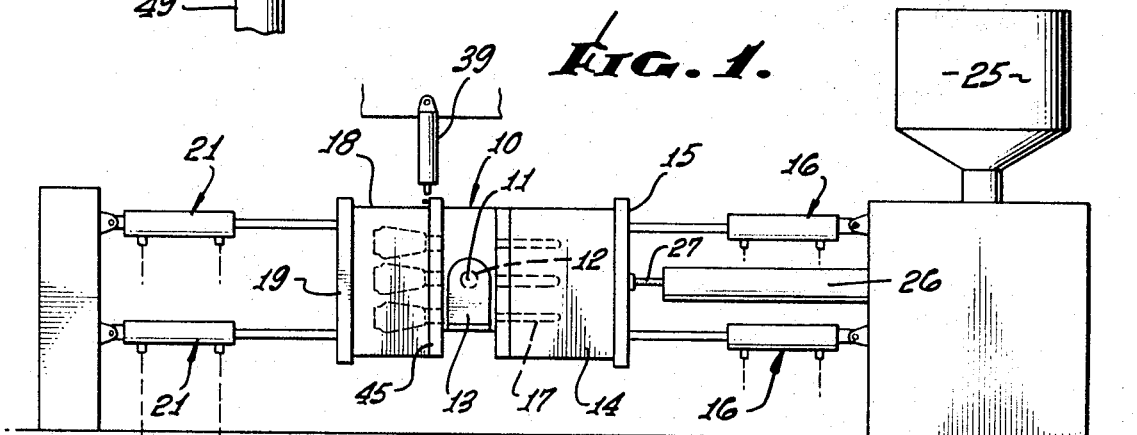

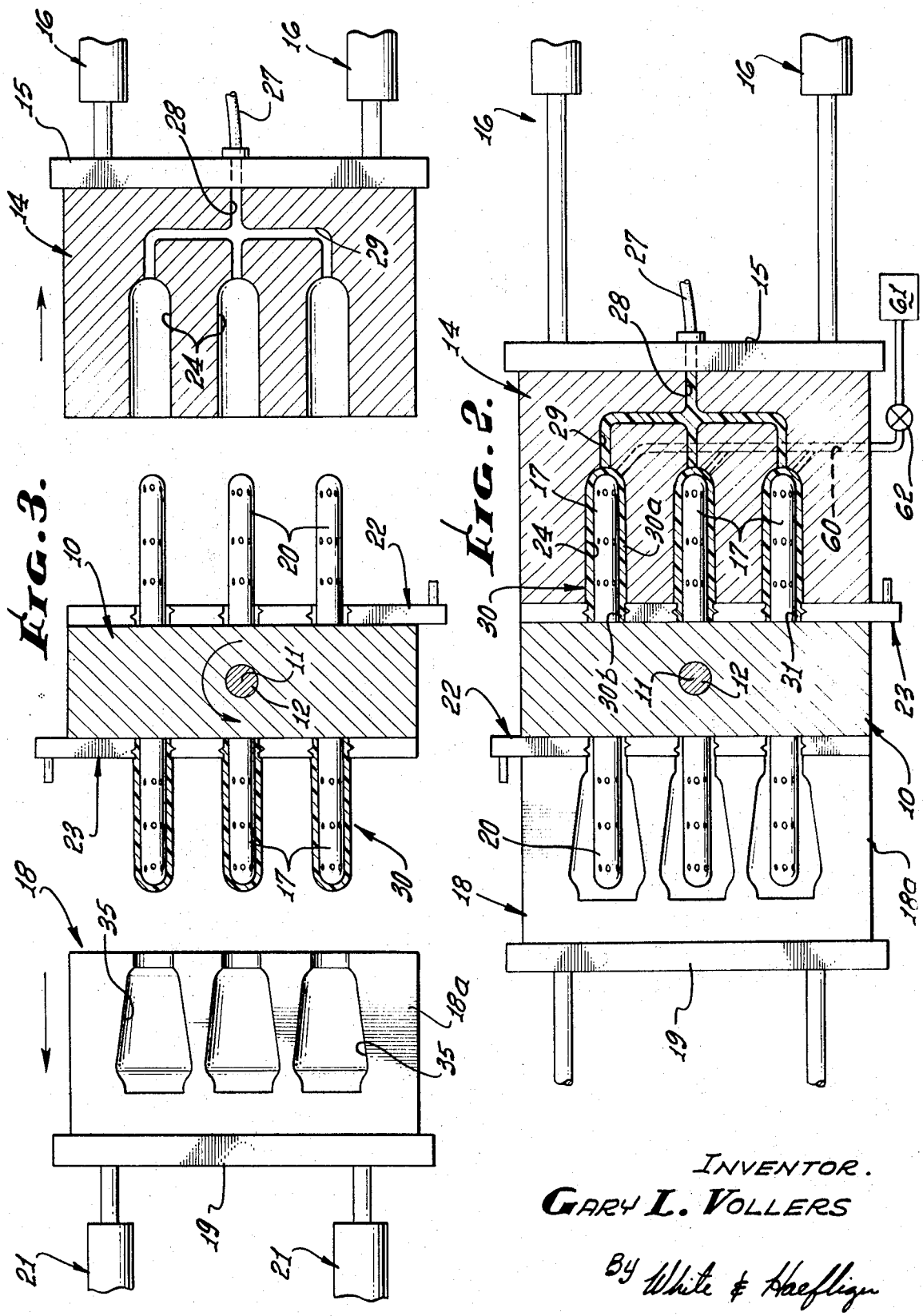

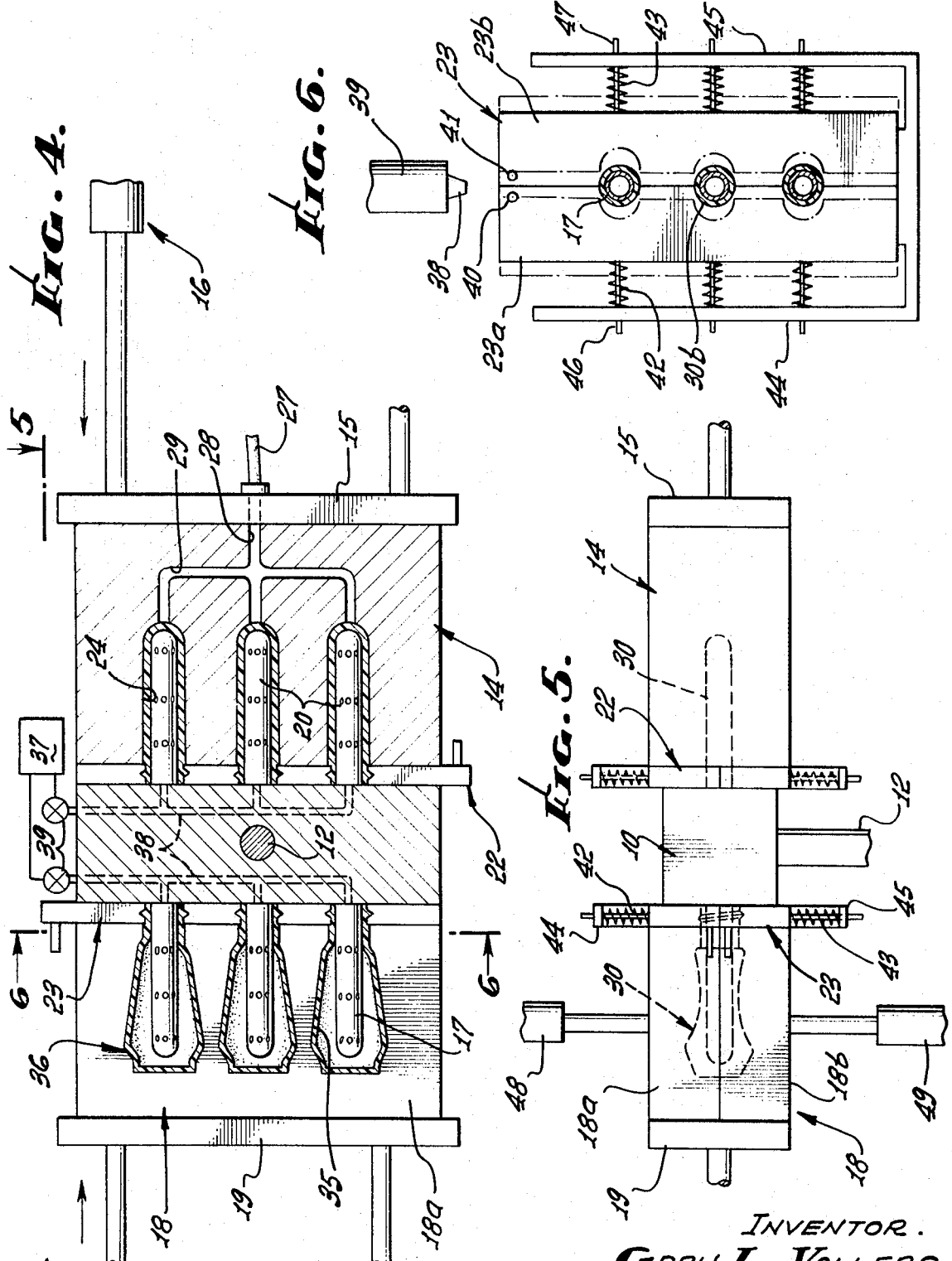

3,616,491
CONTAINER MOLDING APPARATUS
Gary L. Vollers, Upland, Calif., assignor to Pactra
Incorporated, Los Angeles, Calif.
Filed Oct. 27, 1969, Ser. No. 869,564
Int. Cl. B29c *17/07*
U.S. Cl. 18—5 BJ        5 Claims

ABSTRACT OF THE DISCLOSURE

A plastic parison is extruded over a blow nozzle at a forming station; the parison and nozzle are transferred to a blowing station where blowing of the parison into hollow object (for example, a container) form is accomplished; a neck mold releases the container neck; and the blow mold separates the container from the blow nozzle and away from the neck mold, and then releases the container, initial release of the container from the blow mold cavity also being effected during the separation from the blow nozzle.

BACKGROUND OF THE INVENTION

This invention relates generally to the art of blow molding and more particularly concerns apparatus for blow molding containers at high production rates.

In the past, the blow molding of containers has included the steps of forming a plastic parison on a blow nozzle or pin, and thereafter blowing air or gas into the parison via the nozzle to expand the parison into a confining cavity to form the container or bottle. A problem arises when it is desired to form a bottle with a neck, and particularly a threaded neck, since the latter must be confined at the parison forming stage, subsequently transferred in confined state to the blowing station and later released to allow freeing of the bottle. Separation of the container or bottle from the mold cavity in which it is blown is also a problem.

Prior efforts to solve these problems have resulted in such expedients as providing a neck ring which was transferred from the parison forming station to the blowing station and then transferred to the blow mold itself for retraction with the container off the blow nozzle, followed by separation from the container. This procedure requires the use of neck ring retrieval means and added steps associated with recapture of the ring onto the nozzle or carriage therefor, and having the effect of slowing production rates. Also, the removal of the container off the nozzle as by a subsequent blowing step is disadvantageously time consuming.

SUMMARY OF THE INVENTION

It is a major object of the invention to overcome the above mentioned problems and disadvantages, as well as others, through the provision of apparatus of unusually effective mode of operation and simplicity of construction. Basically, the method of forming plastic containers using a blow nozzle and neck ring encompasses the steps that include forming a plastic parison about the nozzle and within the neck ring to provide parison body and neck portions; blowing gas via the nozzle into the parison body portion for effecting expansion of the latter into container body shape while maintaining the neck ring closed about the parison neck portion; and opening the neck ring relative to the neck portion and removing the blown container from the nozzle while retaining the neck ring in association with the nozzle. As will be seen, the blow chamber may have multiple sections; the removal step may be accomplished in response to relative separation of the mold and nozzle; and mold chamber sections may be at least partially separated during the removal step so as to loosen the sections from the blown container. Thus, advantage is taken of the resistance to removal of the container off the nozzle to free the container from the mold sections, and without transfer of the neck ring to the mold sections, whereby simplicity in mode of operation is achieved.

Additional steps include effecting blow mold section separation in directions to leave the container free to drop downward from between the sections; the use of multiple nozzles as defined, to be rotated between parison forming and blowing stations, with such forming and blowing steps carried out generally simultaneously at those stations; the repeated rotation of such nozzles through an indexing angle of approximately 180 degrees to allow horizontal advancement and retraction of the parison forming and blowing molds; and the simultaneous advancement and retraction of such molds in timed relation to opening and closing of the neck ring on a rotary carriage.

In its apparatus aspects the invention includes a blow nozzle and neck ring mounted on a carriage; first means including a parison forming chamber located to receive the nozzle and to effect formation of a plastic parison extending about the nozzle and within the neck ring thereby to provide parison body and neck portions; and other means including a blow molding chamber having a relatively advanced position in which it receives the nozzle and formed parison for blowing of gas via the nozzle into the parison body portion for effecting its expansion into container body shape while the neck ring is maintained closed about the parison neck portion; the blow molding chamber also having a relatively retracted position in which it and the blown container are relatively separated from the nozzle while the neck ring remains on the carriage.

Additional structural features include the provision of blow mold chamber sections and actuator means for at least partially separating the sections during relative movement of the blow mold chamber to retracted position thereby to effect loosening of the sections from the container; means for partially separating neck ring sections while the ring remains on the carriage and prior to relative separation of the blown container from the nozzle; means to rotate the carriage to transfer multiple nozzles and neck rings between parison forming and blowing stations which may be located at 180-degree angular intervals; and actuator means to advance and retract the parison forming and blowing molds on to tool the indexed nozzles, as will be seen.

These and other objects and advantages of the invention, as well as the details of an illustrative embodiment, will be more fully explained in the following specification and drawings, in which:

DRAWING DESCRIPTION

FIG. 1 is a side elevational showing of one form of apparatus incorporating the invention;

FIG. 2 is an enlarged elevation, taken in section, showing details of the molds and carriage seen in FIG. 1;

FIG. 3 is a view like FIG. 2, but showing the molds in retracted position and the carriage rotated;

FIG. 4 is a view like FIG. 3, but showing the molds closed toward the rotated carriage;

FIG. 5 is a plan view taken on lines 5—5 of FIG. 4;

FIG. 6 is an elevation taken on lines 6—6 of FIG. 4;

FIG. 7 is a view like FIG. 5 but showing the blow mold sections partly retracted and partly separated; and FIG. 8 is a view like FIG. 7 but showing the blow mold sections completely retracted and separated, the neck ring sections also being separated on the carriage.

DETAILED DESCRIPTION

Referring first to FIG. 1, the general organization illustrated includes a carriage 10 rotatable about a horizontal axis 11 as by means of a drive that includes an axle 12 supported at 13. A parison forming mold 14 suitably heated is supported by platen 15 and horizontal actuator means 16 to be horizontally advanced toward the carriage to receive blow nozzles 17, and to be retracted away from the carriage to free the nozzles for rotary indexing with the carriage. A blow mold 18 is likewise supported by a platen 19 and horizontal actuator means 21 to be horizontally advanced toward the carriage to receive blow nozzles 20 (better seen in FIG. 2), and to be retracted away from the nozzles to free them for indexing. Nozzles 17 and 20 are alike, and exchange positions when the carriage is indexed 180 degrees about axis 11. A controller for all the drives described and to be described is shown at 100, and may be automatic or hand-operated.

Turning to FIG. 2, the parison forming mold 14 is shown advanced to the left to engage the neck ring 23 retained on the carriage 10. In this position, the nozzles or blow pins 17 project horizontally to the right into the forming cavities 24 in mold 14. Synthetic resinous thermoplastic material, as for example high density polyethylene, styrene or vinyl supplied via hopper 25 in FIG. 1, is extruded at 26 into the cavities 24 via line 27 and passages 28 and 29 in the mold. Plastic material is also extruded into the neck ring cavities 31, which may be threaded as shown, whereby the formed parison includes integral body and neck portions 30a and 30b. FIG. 2 also shows the blow molding chamber 18 advanced against the neck ring 22 at the left side of the carriage; however, parison blowing is not depicted in FIG. 2 since it represents start-up.

Following such parison formation, at elevated temperature (say, between 375° F. and 425° F.) gas is blown into the parison body portions for effecting expansion thereof into container body shape, while maintaining the neck ring closed about the parison body portions. Prior to such blowing, however, the molds 14 and 18 may be relatively retracted horizontally away from the carriage, and the latter rotated approximately 180 degrees about axis 11, as seen in FIG. 3, to bring the nozzles 17 opposite mold 18, and nozzles 20 opposite mold 14. In this regard, the retention of the parison neck portions by closed neck ring 23 assures freeing of the formed parisons from forming mold cavities 24 during relative retraction thereof to FIG. 3 position. Thereafter the molds 14 and 18 are relatively advanced toward the rotated carriage to engage the neck rings 23 and 22 as shown in FIG. 4, the nozzles 17 with formed parisons penetrating the blow mold cavities 35, and the nozzles 20 penetrating the forming mold cavities 24.

FIG. 4 also illustrates blowing of gas via the nozzles 17 and 20 into the parison body portions to effect their expansion into container body configuration, as designated at 36. Gas may be supplied to the nozzles, as from a source 37 and passages 38 in the carriage 10 to which the nozzles remain mounted. Valves 39 are alternately operable to control gas flow to the nozzles 17 and 20. It will be noted that the neck ring 23 remains closed about the parison necks 30b during such blowing. During closure of the molds 14 and 18 against the neck rings 23 and 22, plastic may be extruded into cavities 24 in mold 14 to form parisons about nozzles 20, as also seen in FIG. 4, and as described above in connection with FIG. 2. Also, the number of parisons and mold cavities may be multiplied. Therefore, with such doubling-up of the operations, a very high rate of blown container production may be achieved with a minimum number of stations, molds and part movements. Also contributing to this result is the simplified mode of blown container release, as will be described below.

As will appear, the method of container release includes the step of opening the neck ring relative to the parison neck portion, and removing the blown container from the nozzle while retaining the neck ring in predetermined association with the nozzle or carriage. The removal step is typically accomplished in response to relative separation of the blow mold chamber and nozzle; and advantage may be taken of the forces and relationships created during such removal to loosen the blown container from the blow mold as by at least partially separating blow mold sections during mold retraction.

In the example, the apparatus and steps shown in FIGS. 5–8 represent one illustration of such simplified and unusually advantageous release. The neck ring 23 is illustrated to include opposed sections 23a and 23b in FIG. 6 which are subject to retraction (opening) in opposite horizontal directions to broken line positions as indicated, thereby to free the neck portions 30b of the parisons for withdrawal off the nozzles 17. Such retraction may, for example, be effected in response to downward stroking of a cam pin 38 by actuator 39, for spreading apart the lugs 40 and 41 integral with the respective sections 23a and 23b. Resistance to such retraction of the sections is provided by compression springs 42 and 43 located between the respective sections and fixed back-up structure 44 and 45 on the carriage. If desired, guide rods 46 and 47 may be provided on the sections and to fit in openings in structure 44 and 45, to guide the sections horizontally between closed position as seen in FIG. 5, and open or retracted position as seen in FIGS. 7 and 8. Accordingly, means is provided for at least partially separating the neck ring sections while the latter remain on the carriage and prior to relative separation of the blown container from the nozzle. FIG. 6 illustrates the neck ring separation (broken lines) prior to initial retraction of the containers relative to the nozzle; FIG. 7 shows partial retraction of the container off the nozzle; and FIG. 8 illustrates complete retraction of the container off the nozzle, the retraction direction being horizontal.

The blow mold 18 includes sections 18a and 18b which are themselves separated horizontally in arrow directions 46 and 47 as seen in FIGS. 7 and 8 to free the retracted bottle or container 36 to fall downward into a collection zone, not shown. Suitable actuators to effect such separation are indicated at 48 and 49. In this regard, initial separation of the mold sections 18a and 18b may be effected during retraction of the mold 18 relative to the nozzle, whereby the container which is centered on the nozzle (via the neck portion 30b) during such retraction with the mold is loosened from the mold sections. At the same time, the mold sections, though partly separated, continue to retract the container relative to the nozzle, as by engagement of cavity shoulders with the container, as for example is seen at 51 and 52 in FIG. 7. As a result, the container is assured of complete separation from the mold sections when displaced off the nozzle 17, as for example is indicated in FIG. 8.

Following such retraction and falling of the container out of the mold area, the carriage is rotated and the sections 18a and 18b are closed together and advanced, or vice versa, to the position seen in FIG. 4 for blowing of the next set of parisons to bottle configuration.

Referring back to FIG. 2, a method is shown of aiding the release of the formed parison bodies 30 from the mold cavities 24, if such aid is ever needed. As illustrated, pressurized gas from a source 61 is led via a control valve 62 to passages 60 in the mold terminating at the mold cavities, as for example near the parison tips. At the time of parison withdrawal, the gas pressure tends to drive the parisons from the mold cavities. Note that since the parisons are separated by withdrawal from mold 14, no lengthwise flash is produced.

Referring to FIGS. 2–4, an alternative mode of mold closure against the neck rings 22 and 23 comprises maintaining the mold 14 in fixed position; traveling mold 18 to the right to pick up the carriage 10; and traveling both mold 18 and carriage 10 to the right to engage the neck ring 22 or 23 thereon against the face 14a of mold 14. Thereafter, mold 18 and carriage 10 are retracted to the left, to FIG. 3 position.

I claim:
1. In plastic container blow molding apparatus, the combination comprising,
   (a) a first blow nozzle and container neck ring sections and carriage mount therefor,
   (b) first means including a parison forming chamber located to receive the nozzle and to effect formation of a plastic parison extending about the nozzle and within the neck ring thereby to provide parison body and neck portions,
   (c) other means including a multiple section blow molding chamber having a relatively advanced position in which it subsequently receives the nozzle and formed parison for blowing of gas via the nozzle into the parison body portion for effecting expansion thereof into container body shape while the neck ring is maintained closed about the parison neck portion,
   (d) and actuator means including neck ring opening means for effecting opening of the neck ring sections while the blow mold sections are maintained closed about the container, and blow mold section retract-means and separating means for thereafter effecting positive displacement of the closed blow mold chamber relative to the nozzle and neck ring sections to effect partial retraction of the blown container endwise off the nozzle, followed by relative bodily separation of the blow mold chamber sections to free them from the major side extents of the container just prior to endwise retraction of the container neck portion off the nozzle,
   (e) said parison forming chamber and said blow molding chamber being located at separate forming and blowing stations respectively, there being a second blow nozzle and container neck ring sections mounted on the carriage so that the nozzles simultaneously project at said stations for parison formation and parison blowing, and including means to rotate said carriage to transfer said nozzles between said stations.

2. The combination of claim 1 wherein said blow mold section separating means effects separation of said blow mold chamber sections generally horizontally, and said blow mold section retracting means effects generally horizontal movement of the blow molding chamber to retracted position.

3. The combination of claim 1 including means for applying gas pressure to the inner end of the parison in the forming chamber to urge the parison therefrom during said separating step.

4. The combination of claim 1 wherein said parisons at said stations project in opposite horizontal directions, said means to rotate the carriage having a carriage rotary indexing angle of about 180 degrees.

5. The combination of claim 4 wherein said actuator means is operable to advance said chambers relatively toward one another to encompass said oppositely projecting nozzles, and to relatively retract said chambers therefrom prior to carriage rotation.

References Cited
UNITED STATES PATENTS

| | | | |
|---|---|---|---|
| 2,975,473 | 3/1961 | Hagen et al. | 18—5 X |
| 3,079,631 | 3/1963 | Gasmire | 18—5 X |
| 3,390,427 | 7/1968 | Ruekberg | 18—5 |
| 3,412,186 | 11/1968 | Piotrowski | 264—89 |
| 3,480,993 | 12/1969 | Schjeldahl et al. | 264—97 X |

DONALD J. ARNOLD, Primary Examiner
T. J. CARVIS, Assistant Examiner

U.S. Cl. X.R.
264—97; 18—5 BB, 5 BT